March 17, 1964     L. Q. HINES, SR     3,125,166
ROTARY TILLING IMPLEMENT
Filed April 9, 1963                                         2 Sheets-Sheet 1
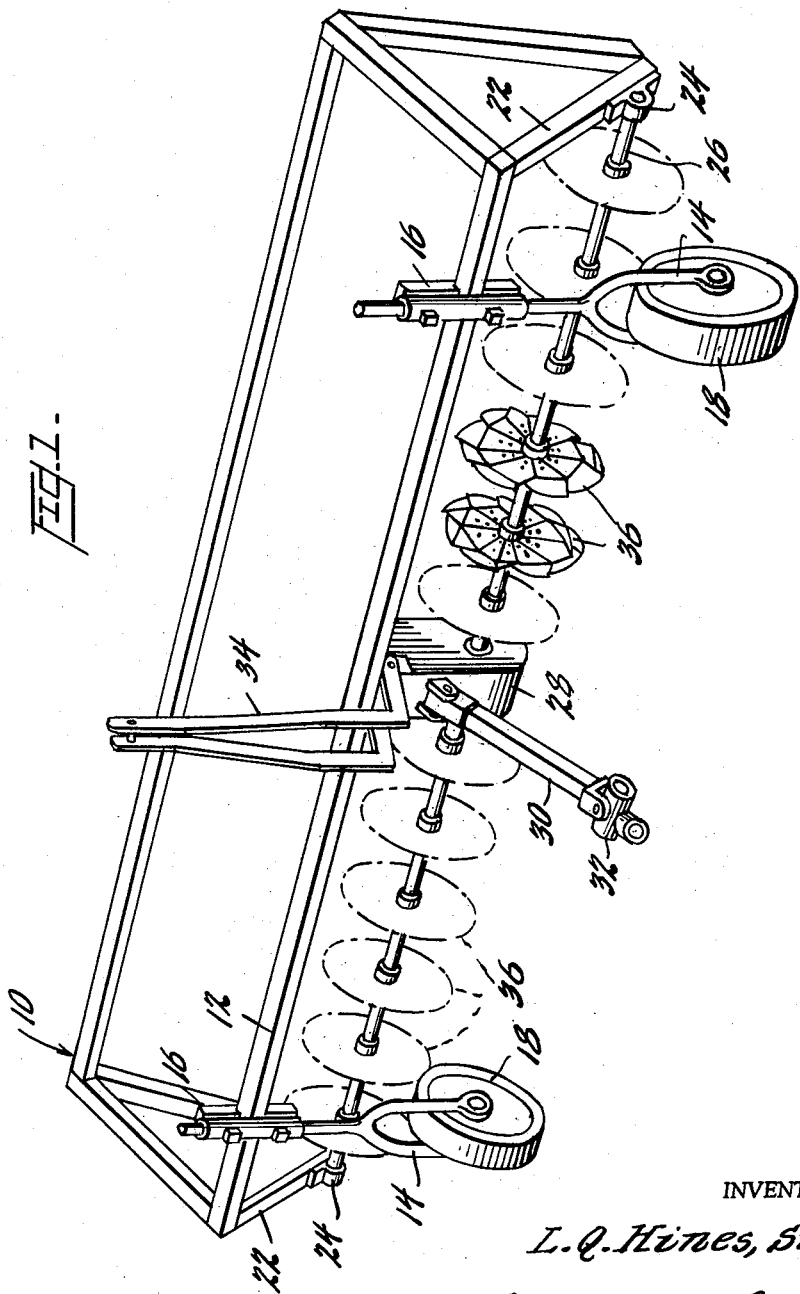
INVENTOR
L. Q. Hines, Sr.,
BY Parker and Walsh
ATTORNEYS

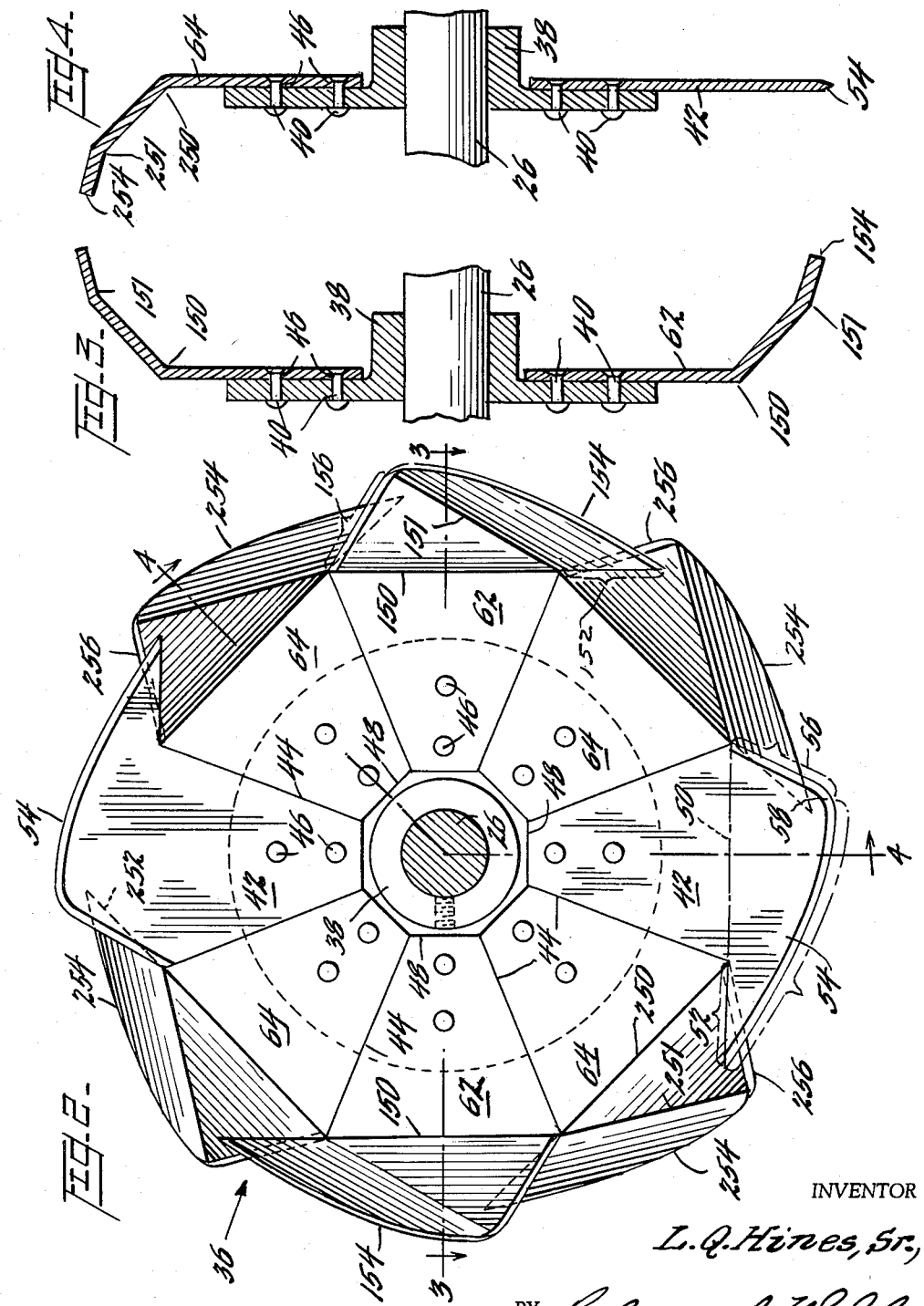

United States Patent Office 3,125,166
Patented Mar. 17, 1964

3,125,166
ROTARY TILLING IMPLEMENT
Lloyd Q. Hines, Sr., P.O. Box 1098, Suffolk, Va.
Filed Apr. 9, 1963, Ser. No. 271,661
6 Claims. (Cl. 172—120)

This invention relates to a rotary tilling implement. The implement employs a plurality of power driven plates somewhat analogous to a disc harrow but designed to be propelled at a relatively higher speed and with the discs being positively driven. Also, the peripheral edges of the discs have been cut and shaped to effectively break up root-clumps and other vegetation in the path of the discs.

In recent years, it has been recognized that power-driven rotary, toothed cultivators have a distinct advantage over the older fixed-toothed cultivators or trip-shank cultivators since they take advantage of the more powerful high speed tractors presently available. However, when used upon ground where plants having tough, vine-like stems have been growing, the apparatus becomes frequently stalled due to the accumulation of vines wrapping around the shaft bearing the rotary elements. The conventional disc harrow is a also inadequate to properly work the soil so that there is presently available no implement exactly suited to this need.

The implement of this invention utilizes a power driven frame of a type presently available in the industry. A wheeled carriage, usually from ten to sixteen feet wide supports a rotating shaft extending across the width of the carriage, the shaft being driven by the power take-off commonly found on farm tractors of today. Mounted upon the shaft are a plurality of discs of a design to be described as the description progresses. The shaft suspension may be tipped about the carriage wheels to lower the edges of the discs below the prevailing soil level and in turn to lift the discs entirely out of contact with the soil. This is accomplished by means of the hydraulic lift also found upon the usual farm tractor. Although the discs which form the principal part of my invention may be made in a single piece from a suitable steel plate, I have found that there is some advantage in constructing the disc of a plurality of sectors. Either the integral discs or the plurality of sectors is bolted on to a hub. These hubs in turn may be spaced along the rotatable shaft at suitable intervals to accomplish the desired working of the soil. It has been found that it is advantageous to vary the spacing of the discs according to the condition of the vegetation and the degree of working required.

The description that follows may be more effectively understood by reference to the accompanying drawings wherein:

FIGURE 1 is a front view of a complete tilling implement showing two cultivating discs in full line together with others in dotted outline to indicate the relative placement of an entire gang of discs;

FIGURE 2 shows an enlarged side view of a single disc; and

FIGURES 3 and 4 shows two cross-sectional views taken on the lines 3—3 and 4—4 respectively of FIGURE 2.

Referring first to FIGURE 1, the frame of the implement designated at 10 is desirably made of a plurality of steel bars or tubes. Welded together upon the forward part of the frame 10 is the diamond bar 12 which supports the shanks of two forked wheel supports 14 by means of clamp element 16. These clamp elements permit the wheel supports to be adjustable as to height and are themselves adjustable along the length of the diamond bar 12, to accommodate the implement to varying conditions of terrain. A suitable cover (not shown) limits the movement of flying earth particles cast by the operative parts of the implement.

Side frame members 22 extend downwardly to the support bearings 24 for the operating shaft 26. The shaft 26 is caused to rotate through its connection to gear box 28 mounted upon the frame 10. Power for the gear box is delivered through the power shaft 30 connected to the power takeoff of the tractor by means of universal joint 32. A pair of arms 32 extend upwardly to connect to the rearwardly extending arms of the hydraulic mechanism of the tractor. Pulling the arms 34 forward has the effect of raising the operating elements out of contact the ground whereas relaxation of the hydraulic mechanism rocks the frame of the vehicle backwardly about the axis of the wheels 18 to engage the tilling elements with the soil.

The general arrangement of the tilling implement thus far described in presently available commercially (as for example, in my Patent No. 3,066,743). This invention is particularly concerned with the tilling elements 36 as they are mounted for use upon the previously described apparatus. I prefer to use a plate formed of a plurality of sectors mounted upon a hub 38, securable upon shaft 26. In FIGURES 2 to 4, the tilling element 36 utilizes eight sector plates, each occuping 45° of the circumference. Six plates of 60° each may be employed or, as will be indicated, a larger number may also be used.

The sector plates are of three types; all have many features in common but the combination of all three produces the preferred result. The sector plates are made of plate stock of substantial uniform thickness and all terminate at a point sufficiently short of the center of the corresponding circle to provide clearance for the hub 38. The plates may be secured to the hub flange by means of rivets 40 or other fastening devices. In FIGURE 2, two sector plates 42 illustrate the first type. A pair of converging sides 44 coincide with radii of a circle arranged at right angles of the axis of rotation. Holes 46 are provided to receive the rivets 40. The sector plate is truncated at 48 to provide clearance for the hub 38.

The edges 44 and 48 and the chord line 50 define the central body portion, a truncated triangle, of the sector plate 42. Outwardly of the chord line 50 is a generally segment-shaped portion. The segmental portion is bounded by the chord line 50 and three edges 52, 54 and 56. The edge 52 may be considered as an extension of the chord line 50, forming with a radius 44 an internal, obtuse angle. The edge 54 forms approximately the circumference of a circle having the axis of rotation as its center. The edge 56 forms an external obtuse angle with the second radius 44 and, at the point where edges 54 and 56 intersect, they may be somewhat rounded off as shown at 58. The edges 54 and 56 and the rounded portion 58 are desirably sharpened in a cutting edge. When the plate is rotated, the edge 56 leads, not only cutting into the turf-like vegetation growth but also aiding to chop up any trailing vine-like matter.

The second type of plate 62, may be initially formed in the same manner as the plate 42; however, it is not left flat. The segment portion of the plate, as shown in FIGURE 2, is bent upwardly along the line 150, forming an outside angle of about 30° to 45° with the body of the plate. The line 150 is a chord corresponding substantially to the chord 50 of plate 42. Plate 62 is further bent along the line 151 to an outside angle of 20° to 30°. The line 151 extends approximately from the intersection of the circumference 154 with the outer end of the leading edge 156, to the intersection of the trailing edge 152 with a radius 44, the reference numerals 152, 154 and 156 having substantially the corresponding significance in plate 62 as the numerals 52, 54 and 56 do in their relationship to plate 42. However, it is to be noted that the circumferential edge 154 of plate 62 is not sharpened whereas the leading edge 156 is sharpened in a manner similar to edge 56 of plate 42.

The plates 64 differ from the plates 62 in that the segmental portions thereof are bent oppositely. That is to say, whereas in FIGURE 2 the segmental portion of plate 62 is bent forwardly of the plane of the drawing along the lines 150 and 151, in plate 64 the segmental portion is bent downwardly beyond the plane of the drawing along lines 250 and 251. Thus the plates 62 and 64 are mirror images, one of the other.

In the embodiment shown in FIGURE 2, the complete plate 36 is assembled of two sector plates each designated 42 and 62 and four designated 64. The arrangement of plates interchangeably mountable upon the hub 38 makes possible various arrangements of the three types of plates. It has been found that some soil and vegetation conditions respond to working with one combination of plates while other conditions require the use of a different combination for most effective results. One preferred arrangement employs four elements each of the types designated 62 and 64 arranged in alternating relationship. Still another makes use of three plates each of all three types, evenly distributed about the circumference of the disc. In such case, each sector occupies a space of 40°. The distribution of the sector plates around the circumference, particularly elements 62 and 64, results in more effectively breaking up of root clumps without extensive displacement of the soil in furrows such as would take place if all the plates were of a single type. Results obtained by the use of my device are also greatly superior to the action of conventional disc harrows which bear an analogous relationship to a plate composed entirely of elements 42.

It is not necessary to construct the tilling plate 36 from individual sector plates. For example, the plate of FIGURE 2 may be made by making eight separation cuts corresponding to lines 52 and 56 and performing the necessary bending and sharpening operation. The production of the individual sector plates may be a little less awkward but this depends entirely upon the choice of metal processing equipment.

When used with a tractor of adequate power and speed, the apparatus of this invention has proved exceptionally efficient in tilling large acreage at low cost. Especially, when tilling soil upon which vine-like plants have been growing, it has not been necessary to frequently stop the implement to clear the axle of large masses of vines that have twisted around it. Some implements equipped with other types of tilling elements are particularly susceptible to this type of delay.

Since it has been indicated that the invention has several embodiments, reference should be had to the claims that follow for the particular definition of the invention.

I claim:
1. In a rotary tilling implement wherein a plurality of disc-like tilling elements are mounted upon a positively driven rotary shaft, the shaft being arranged at right angles to the direction of implement travel and the tilling elements being spaced along said shaft to rotate in parallel planes, parallel to the direction of implement travel, a plurality of tilling elements each element including:
   a tilling plate of generally dic shape, said plate having at least six sectors, each sector having:
      a central body portion extending outwardly along the two radii of the sector, said body portion being defined by said radii and a chord segment of said disc,
         said chord segment being a part of a chord of said disc, the length of said chord being approximately equal to a radius of said disc when six sectors are used, said chord having a length relatively less than that of said radius when more than six sectors are used, and
      a segment portion extending outwardly of the body portion toward the circumference of said disc and defined by a pair of straight lines and said circumference,
         one of said lines being an approximate extension of one end of said chord segment to said circumference, and the other of said lines joining the other end of said chord segment to the circumference and forming an internal acute angle with said chord segment,
         the edge defined by said other of said lines being sharpened to a cutting edge;
   at least two of said sectors being circumferentially spaced sectors wherein:
      the segment portion is bent with respect to the body portion along the chord segment joining said portions forming an obtuse dihedral angle between the two portions and wherein;
         the segment portion is further bent into an inner, triangular portion and an outer, circumferential portion, said last named portions forming a second obtuse dihedral angle,
         the line forming the intersection of said last named portions extending from the junction of said chord segment and said chord segment extension to the circumferential end of the cutting edge;
   at least two other of said sectors being circumferentially spaced sectors wherein each segment portion is bent similarly to the first pair of sectors but in the opposite sense with respect to the plane of the body portions of the sectors, said second pair of sectors being individually circumferentially interspersed with said first pair of sectors and hub means for removably securing said element to said shaft.

2. The structure according to claim 1 wherein the remaining two of said six sectors are each individually circumferentially interspersed among the first two pair of sectors, but unbent, the circumferential edges of said remaining two sectors being sharpened to a cutting edge.

3. The structure according to claim 1 wherein the hub means includes a mounting plate and wherein the sectors are individually formed and are removably secured to the mounting plate.

4. The structure according to claim 1 wherein, in the sectors, the line which forms the internal acute angle with the chord segment is substantially parallel with that radius of the body portion joining said chord segment opposite said angle.

5. The structure according to claim 1 wherein, in the bent sectors, the line which forms an internal acute angle with the chord segment is substantially at right angles to the line joining said triangular portion and said circumferential portion.

6. The structure according to claim 1 wherein, in a complete plate, in unbent condition, the straight cutting edge of each sector and the chord extension of each adjacent sector are substantially coincident.

References Cited in the file of this patent

UNITED STATES PATENTS

| | | |
|---|---|---|
| 396,374 | Sherman | Jan. 15, 1889 |
| 544,837 | Archer et al. | Aug. 20, 1895 |
| 930,951 | Fox et al. | Aug. 10, 1909 |
| 989,338 | Corne | Apr. 11, 1911 |
| 2,835,182 | Smithburn | May 20, 1958 |
| 3,102,376 | Henderson | Sept. 3, 1963 |